United States Patent Office 3,011,386
Patented Dec. 5, 1961

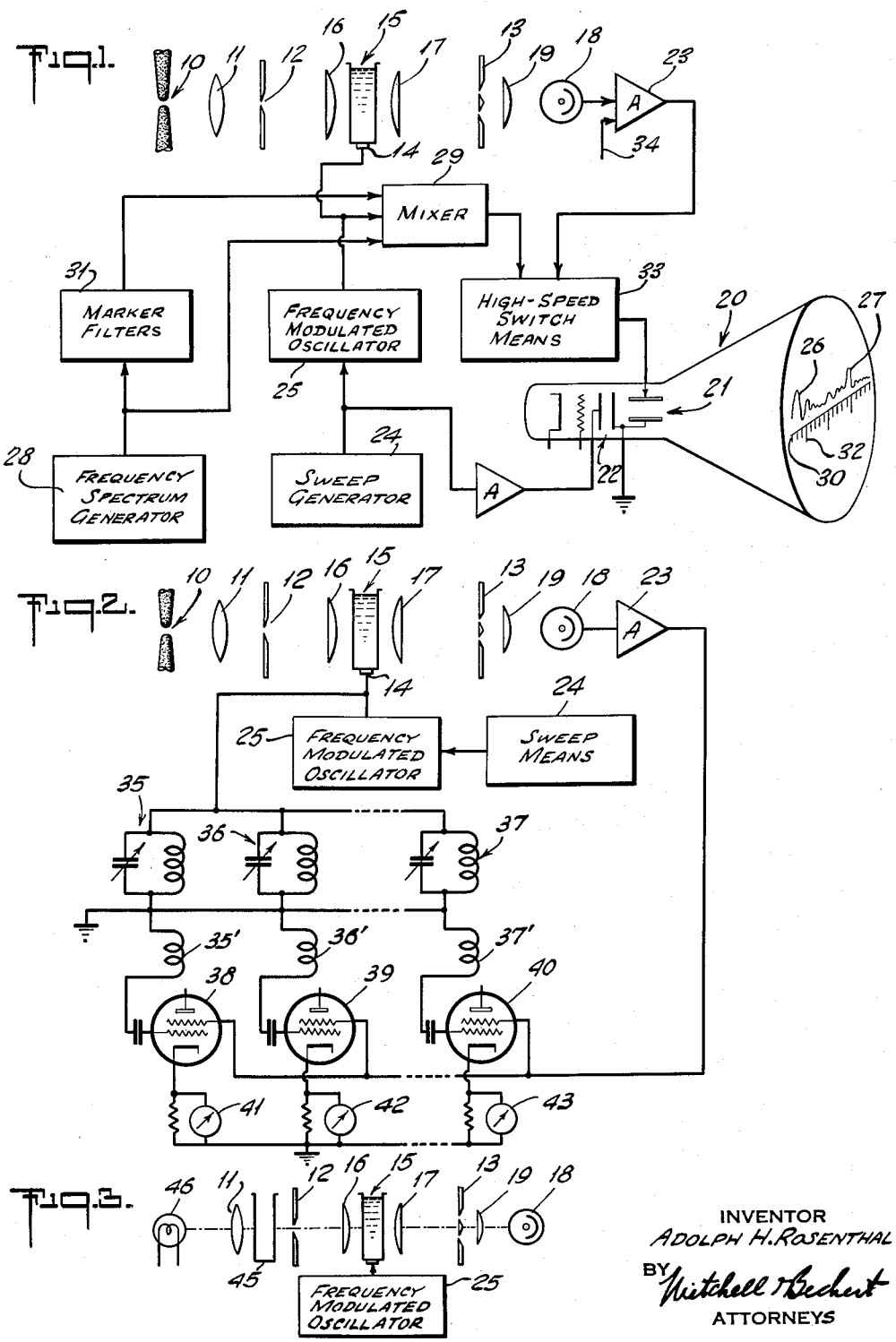

3,011,386
SPECTROMETER
Adolph H. Rosenthal, Forest Hills, N.Y., assignor, by
 mesne assignments, to Servo Corporation of America,
 Hicksville, N.Y., a corporation of New York
Filed Aug. 1, 1955, Ser. No. 525,432
21 Claims. (Cl. 88—14)

This invention relates to recording and indicating spectrometers for spectral analysis.

It is an object of the invention to provide improved devices of the character indicated.

It is another object to provide an improved spectrometer which, in addition to being accurate and reliable, will permit as fast as possible an analysis of a given spectrum.

It is also an object to provide an improved spectrometer, inherently free from "ghosts," as are present in spectrometers employing ruled diffraction gratings.

It is a specific object to meet the above objects with a completely automatic device.

It is another specific object to provide special-purpose spectrometers for directly and quantitatively indicating the intensity distribution of one or more specific lines in a spectrum to be analyzed, and thereby determine the proportion of components of a mixture being analyzed.

Still another object is to produce an improved scanning monochromator.

It is a general object to meet the above objects with a device requiring no mechanically moving parts.

Other objects and various further features of novelty and invention will become apparent or will occur to those skilled in the art from a reading of the following specification in conjunction with the accompanying drawings. In said drawings, which show, for illustrative purposes only, preferred forms of the invention:

FIG. 1 is an optical and electrical diagram schematically showing component parts of a fast-recording spectrometer incorporating features of the invention;

FIG. 2 is a similar diagram of another form of the invention; and

FIG. 3 illustrates a modification for a part of the apparatus of either FIG. 1 or FIG. 2.

Briefly stated, this invention contemplates the application of ultrasonic-cell light-modulating techniques to spectral analysis. Such techniques have been described in specific application to color modulation utilizing an ultrasonic cell, so that they need not be described in detail in the present case. It suffices to say that the spectrum to be analyzed may be provided by a source of light (or by a transparent absorption cell in the path of light from a constant source), said light being directed onto an ultrasonic light-modulating cell, combined with diaphragm means effective upon excitation of said cell to control the passage of a predetermined color component of the spectrum formed by said cell. An electric oscillator excites the cell and, depending upon the frequency of excitation, various wavelength regions or colors within the spectrum are passed by the diaphragm.

The present invention makes use of such modulation of an ultrasonic cell to produce what may be called an ultrasonic wave grating, whereby an ultrasonic monochromator is obtained. More specifically, the invention is concerned with means for observing the intensity of light passed by a light-modulating ultrasonic-cell system and for displaying the observed intensity or amplitude as a function of the oscillator frequency and, therefore, as a function of the color component to which a particular frequency corresponds. In one form to be described, the display device is capable of displaying the entire spectrum, and the frequency of the source is periodically so modulated as to scan this entire spectrum; the output of the light-responsive device is caused to amplitude-modulate the display. In the other general form to be described, one or more narrow-band filters are centered at particular oscillator frequencies, corresponding to desired color components in the spectrum; these filters individually govern amplitude-display means responsive to the output of the light-responsive means. In this way, a quantitative display of the intensity of selected color components may be continuously developed.

Throughout the specification and claims, reference is made to "light," and this term will be understood to apply to all radiant energy capable of being accommodated by the described parts. "Light" as used herein will thus be understood to include visible and/or invisible light, as in the infrared region.

Referring to FIG. 1 of the drawings, the invention is shown in application to a spectrometer creating a visual spectral display, in the form of a curve representing relative-intensity values for spectral lines as a function of the optical wavelength. The material to be analyzed may be inserted in or be part of an energy source, which may include an arc light or a flame, commonly used in spectroscopy; in certain cases, the source 10 may be a special demountable discharge tube, such as a hollow cathode or other light source. The source 10 will also be understood, in certain cases, as represented directly by a furnace opening, as, for example, in metallurgical applications.

The source 10 is imaged by means 11 on the entrance slit of a diaphragm 12 of an ultrasonic-cell system as described in detail in copending patent application, Serial No. 217,104, filed March 23, 1951, now Patent No. 2,807,-799, issued September 24, 1957. As explained in said application, a certain wavelength region or spectral line will issue from the apertures of a second diaphragm 13 for a particular oscillating frequency exciting the crystal 14 of the ultrasonic light-modulating cell 15. The cell 15 is in a collimated region between collimating lenses 16—17, serving to image the slit of diaphragm 12 onto the plane of diaphragm 13. The radiation issuing from diaphragm 13 is focused by means 19 on a radiation-sensitive transducer 18, which may be a photocell or a photomultiplier or an infrared-sensitive device, such as a bolometer, thermocouple, lead-sulfide cell, Golay cell, thermistor or the like, depending upon the radiation region being investigated.

As indicated generally above, a visual-display device 20 creates a display representing amplitude of response at 18 as a function of spectral wavelength (which, in turn, is inversely proportional to frequency of excitation of the cell 15). In the form shown, the display device 20 is a cathode-ray tube having mutually perpendicular deflection systems 21—22 and excited by means (not shown) to produce a spot of constant intensity on the display face. Output of photocell 18 is amplified at 23 and applied directly to the vertical-deflection system 21, and output of a sweep generator 24 is applied to the other deflection system 22. The sweep generator 24 is connected in controlling relation with the oscillator 25, so that position along the sweep base may correspond to the instantaneous frequency of excitation of the cell 15. With the parts thus far described, the spectrum development will have the appearance of the upper curve shown on the face of the tube 20 and marked by predominant lower and upper peaks 26—27, representing peaks in the spectral response of the material injected at 10.

In accordance with a further feature of the invention means are provided for establishing on the display face of tube 20 reference marks identifiable with known frequencies or with known lines in the spectrum. For this purpose, a frequency-spectrum generator 28, which may be stabilized by a crystal, may develop a spectrum of harmonic peaks, each having the same stability and accuracy as the fundamental crystal. This spectrum is supplied directly to a mixer 29 for mixing with the output of the frequency-modulated oscillator 25. For each coincidence of a harmonic frequency (within the frequency spectrum of generator 28) with the instantaneous oscillator frequency, mixer 29 will develop an output pulse. Such pulses will be of substantially uniform amplitude and may, when applied to the deflection system 21, produce vertical reference marks, as at 30, on the face of the tube 20. In a separate line, marker filters, designated generally 31 may serve to select and individually amplify certain of the harmonic frequencies in the output of generator 28, for separate supply to the mixer 29, thereby causing subdivision markings 32 of greater amplitude, say, for every fifth frequency-identifying mark across the spectrum.

While signals from mixer 29 and amplifier 23 may be applied simultaneously to deflection system 21, it is preferred to avoid ambiguity between marks produced by marking means 28—31 and the curve developed in accordance with the response of photoelectric means 18. For this purpose, a high-speed commutator 33 is provided to separately receive the outputs of the mixer 29 and of the amplifier 23, so that at any one instant of time only one mark will be created on the face of the tube 20. The speed of operation of commutator 33 is preferably so high, compared with the sweep rate of generator 24, that, in effect, the response curve and the marker lines appear to be developed simultaneously along the face of the tube 20. In order that the curve and the marks may be displayed in vertically separated relation, mixer 29 and amplifier 23 will be understood to include biasing means, suggested at 34, for assuring the desired difference in average level of signals applied by these two sources to the display means 20.

It will be appreciated that with the rise and fall of the sawtooth produced by sweep generator 24 as a function of time, the spectrum produced over the left face of diaphragm 13 will scan the apertures in diaphragm 13, so that successively different wavelength regions will pass these apertures and excite the radiation-sensitive transducer 18. Preferably, the display tube 20 is a standard phosphor-screen cathode-ray tube having high persistence characteristics; alternatively, tube 20 may be a so-called dark-trace cathode-ray tube. With long persistence, the displayed spectrum may be directly viewed or, if a permanent record of the spectral curve is desired, it can be photographed from the tube face; alternatively, the horizontal-deflection voltage can control the rotation of a drum, and the vertical-deflection voltage can displace a stylus directly writing on the drum or a light beam photographically writing on the drum. At any event, the term "display means" as generally employed herein will be understood to apply to these and other known display and recording mechanisms.

As indicated generally above, the invention is also applicable to a spectrometer for indicating the percentage content of certain materials in a particular mixture; such a device is shown in FIG. 2. It is known that the relative amount of materials in a mixture can be determined by the intensity of certain chosen spectrum lines characteristic of particular materials; in quantitative spectral analysis, these lines are known as "rayes ultimes." In measuring only the relative intensities of such lines, the amount of material can be determined with great accuracy. In many industrial spectral analytical problems, the type of material is known but it is important to know its amount. Thus, in steel analysis one knows which materials are present, such as carbon, cobalt, manganese, chromium, etc., but one has to know exactly the percentage of each of these components to determine the metallurgical properties of the steel. The device of the present invention can establish this percentage quickly during the melting process, because the molten mixture can adequately provide the energy source 10 for analysis.

Some industrial spectrometers working with standard diffraction gratings have preset slits at the position of known spectral lines, and behind each slit is a photocell, and associated circuitry, the output of which is indicated by a meter calibrated in percentage by weight. While this procedure can also be applied with the present ultrasonic monochromator, which is, in effect, an ultrasonic wave grating, the fast spectral-scanning possibility by frequency modulation of the grating permits the simple solution represented by FIG. 2.

In FIG. 2, the optical elements of the system correspond to those described in FIG. 1 and are therefore given the same reference numerals. The frequency-modulated oscillator may be governed by a manual control of frequency or automatically by the sweep means 24, and, in addition to exciting the cell 15, the oscillator output is applied to a plurality of separate display-control circuits. The function of each such control circuit is to cause or permit a particular amplitude display essentially only for a single preselected line or narrow band in the optical spectrum. This function can be achieved by switching means activating the amplitude display under control of means synchronized with or cyclically referenced to sweep means 24, but in the form shown, these control circuits employ tuned filters, such as tank circuits 35—36—37, each tuned to a different relatively narrow frequency band within the frequency-modulated spectrum and therefore representing substantially a discrete color component or line in the color spectrum. Whenever the changing frequency coincides with one of the frequencies of these tuned circuits, voltage is induced in a coil, such as the coil 35', coupled to the inductance of the tank circuit 35, and this voltage is impressed on one of the control grids of a tube 38; similar relationships apply for the tubes 39—40 associated with tank circuits 36—37. The other grids of the tubes 38—39—40 are connected to the output of the photoamplifier 23, and separate amplitude-responsive meters 41—42—43 in the cathode circuits of tubes 38—39—40 serve directly to read spectral intensity for the instant at which the associated tank circuit rings. With this arrangement, each meter will indicate the intensity of light of a predetermined spectral line or region issuing from the diaphragm 13, whenever the crystal-excitation frequency is such that this predetermined spectral region or line coincides with the apertures in diaphragm 13.

In a typical application of the device of FIG. 2 to the steel industry, the optical parts may be so oriented and aligned that the source 10 is a molten alloy, the component proportions of which are to be monitored; the source 10 may thus represent optical alignment through a furnace opening. If the alloy should require a carefully controlled proportioning of cobalt, manganese and chromium, for example, the capacitors of the respective tank circuits need only to be adjusted once. Thus, the capacitor of circuit 35 should be set so that the resonant frequency of circuit 35 produces such a spectral position on diaphragm 13 that a particular strong resonance line of cobalt falls on the apertures of diaphragm 13. Similarly, circuit 36 can be adjusted for a characteristic line of manganese, and circuit 37 for a characteristic line of chromium. The variable-capacitor settings may be calibrated directly for the various elements of interest, showing, for example, for adjustment of circuit 35 a preset point for cobalt, for adjustment of circuit 36 a preset point for manganese, and for adjustment of circuit 37 a preset point for chromium. The corresponding meters 41—42—43 may be similarly calibrated to read directly in percentage of a particular component element.

The arrangement of FIG. 3 represents an alternative for the optical systems of FIGS. 1 and 2, applicable to absorption spectral analysis, in that the material to be analyzed may be supported or contained within a transparent absorption cell 45 placed on the optical axis and illuminated by a source 46 having substantially a continuous spectrum, such as an incandescent or globar lamp.

It will be seen that this invention provides a substantially improved spectrometer, in that the scanning of the spectrum can be effected automatically, without mechanically moving parts, and quite rapidly. Scanning speed depends on such factors as the wavelength region to be investigated, the cell length, and the spectral resolution required. For example, using an ultrasonic-cell length of about 3 cm., and water as the ultrasonic medium, and 15 mc./s. as the center frequency for excitation of the crystal 14, a wavelength region corresponding to one micron (i.e. about double the visible spectrum, or from one to two microns in the infrared, etc.) can be scanned within 1/25 of a second, and with a resolution of 1000 steps, each about 10 A wide. This periodicity (i.e. 1/25 sec.) would be more than adequate to produce an apparently continuous and persistent display image, as on the screen of a cathode-ray tube.

In spite of the inherent simplicity of the described spectrometer, a number of obvious design expedients will improve the adaptability to special-purpose applications. Thus, the amplifier means 23 from the transducer 18 may be either linear, logarithmic, or otherwise characterized, depending on the type of output or display that is desired. These amplifier characteristics or the frequency-modulation function can be designed to compensate for or to "equalize" various irregularities, such as absorption inherent in the optical components, including the liquid in the cell 15, as well as transducer-sensitivity variation with wavelength. This is particularly important in the infrared, where many liquids and glasses have their own characteristic absorption spectra. Of course, depending on the spectral region, particular liquids (15) and glasses (11—16—17—19) and cells (18) and optical filters can be selected for advantageous spectral transmission in the ultrasonic light modulator, which adds considerably to the flexibility of the device; further flexibility may result from amplitude-modulating at 50 (FIG. 1) the oscillations from source 25, said modulations following a cyclic pattern or envelope, as derived from a suitably characterized potentiometer 51 driven by means 52 synchronized with sweep means 24.

Quite aside from the speed of scan, a particular advantage of the described ultrasonic grating is its inherent freedom from "ghosts," which are a perpetually disturbing factor in ruled gratings.

While I have described the invention in detail for the preferred forms shown, it will be understood that modifications may be made within the scope of the invention as described in the claims which follow.

I claim:

1. A spectrometer, comprising an ultrasonic light-modulating cell, optics including said cell and including diaphragm means, means exposing said optics to light for spectral analysis, said diaphragm means being effective upon excitation of and in cooperation with said cell at a particular frequency to pass a predetermined color component of the spectrum formed by said cell, an electric oscillating source connected to said cell, said source including means for varying the frequency of oscillation thereof, means disposed in the path of light passed by said diaphragm means and electrically responsive to light passed by said optics, marker means comprising an electric signal generator having an output characterized by discrete known frequencies in the range of frequency variation of said source, means connected to said source and to said marker means whereby varying frequency of said source necessarily causes the same concurrent frequency sweep of said cell and of said marker means, and display means connected to said electrically responsive means and to said last defined means and simultaneously displaying the amplitude of light passed by said optics in coordinated relation with the cell-excitation frequency at which such light is passed, as well as in coordinated relation with the output of said last defined means.

2. A spectrometer according to claim 1, in which said frequency varying means periodically sweeps the oscillating frequency of said oscillating source through a range representing a spectrum to be scanned by said spectrometer, and in which said display means includes a plurality of separate amplitude-display devices connected to the output of said light-responsive means, and separate control means for each display device including separate filters responsive to the instantaneous sweep frequency and having narrow pass bands, each pass band representing a different color component in said spectrum.

3. A spectrometer according to claim 2, in which said filters are tank circuits tuned to frequencies representing the desired color components within said spectrum.

4. A spectrometer according to claim 2, in which said filters are separate tank circuits connected to the output of said oscillating source and tuned to different frequencies representing different color components in said spectrum, each of said display devices including a control element governed by the tank circuit associted therewith, whereby, upon excitation by its particular tank circuit said control element will be effective to pass to the amplitude display means associated therewith, the instantaneous amplitude signal developed by said light-responsive means.

5. A spectrometer according to claim 27, in which said display means includes a narrow-band filter effectively connecting the output of said light-responsive means to said display means.

6. A spectrometer according to claim 5, in which the bandwidth of said filter corresponds to essentially the width of a line in said spectrum.

7. A spectrometer according to claim 5, in which the effective bandwidth of said filter corresponds to substantially a 10A band in the spectrum passed by said optics.

8. A spectrometer according to claim 1, in which said means exposing said optics to light comprises a heat source, and a material of unknown spectral composition subjected to heat from said source.

9. A spectrometer according to claim 1, in which said means exposing said optics to light comprises an electric arc, and a material of unknown spectral composition in the discharge region of said arc.

10. A spectrometer according to claim 1, in which said means exposing said optics to light comprises a constant light source, and transparent-cell means for confining a material of unknown spectral composition.

11. A spectrometer according to claim 1, in which said frequency varying means periodically sweeps the oscillation frequency of said oscillating source through a range representing a spectrum to be analyzed, and in which said display means includes control means including a filter having a narrow pass band representing essentially a single color component in said spectrum.

12. A spectrometer according to claim 1, and control means for said display means including means responsive to a particular instantaneous variation of said frequency-varying means and identifiable with a particular frequency, said control means only governing said display means for amplitude response essentially during the interval of said instantaneous variation.

13. A spectrometer, comprising an ultrasonic light-modulating cell, optics including said cell and including diaphragm means effective upon excitation of said cell to control the passage of a predetermined color component of the spectrum formed by said cell, means exposing said diaphragm means and cell to light for spectral analysis, means disposed in the path of light passed by said diaphragm means and electrically responsive to light passed by said optics, a variable frequency source exciting said cell, display means connected to the respective outputs of said two last-defined means and displaying optically transmitted amplitude as a function of excitation frequency, and a source of reference frequencies within the range of frequency variation of said source, said display means being connected to said reference-frequency source and displaying said reference frequencies on the same frequency scale as said amplitude variations.

14. A spectrometer according to claim 13, in which said display means includes means sequentially commutating the output of said light-responsive means and the output of said reference-frequency source to said display.

15. A spectrometer, comprising an ultrasonic light-modulating cell, optics including said cell and including diaphragm means effective upon excitation of and in cooperation with said cell to control the passage of a predetermined color component of the spectrum formed by said cell, means exposing said optics to light for spectral analysis, means disposed in the path of light passed by said diaphragm means and electrically responsive to light passed by said optics, a variable-frequency source exciting said cell, display means connected to the respective outputs of said two last-defined means and displaying amplitude as a function of frequency, a frequency-spectrum generator delivering a plurality of reference frequencies within the range of frequency variation of said source, said display means being connected to said frequency-spectrum generator and displaying said reference frequencies on the same frequency scale as said amplitude variations, said display means including means sequentially commutating the output of said light-responsive means and the output of said frequency-spectrum generator, and means mixing the output of said variable-frequency source with that of said frequency-spectrum generator, whereby marker pulses are generated on frequency-coincidence of the outputs of said spectrum generator and of said source.

16. A spectrometer according to claim 15, in which said display means includes a cathode-ray display device including a base sweep synchronized with variation of the frequency of said source, and means modulating the display of said display device against said base sweep in accordance with the output of said light-responsive means and in accordance with the output of said mixer.

17. A spectrometer according to claim 16, in which said last-defined means includes means biasing the outputs of said light-responsive means and of said mixer relatively to each other, whereby separate displays of the spectral response and of the reference-frequency marks are developed against the same sweep base.

18. A spectrometer, comprising an ultrasonic light-modulating cell, optics including said cell and including diaphragm means effective on excitation of and in cooperation with said cell to pass a predetermined color component of the spectrum formed by said cell, means for exposing said optics to light for spectral analysis, frequency-modulating means exciting said cell, means disposed in the path of light passed by said diaphragm means and electrically responsive to light passed by said optics, and amplitude-display means including two electrical filters having different narrow pass bands within the range of frequency modulation by said frequency-modulating means, and connected in parallel to the output of said light-responsive means, whereby the outputs of said filters will represent the respective relative magnitudes of two color components in the spectrum swept by the action of said frequency-modulating means on said cell and diaphragm means.

19. A spectrometer, comprising an ultrasonic light-modulating cell, optics including said cell and including diaphragm means effective on excitation of and in cooperation with said cell to pass a predetermined color component of the spectrum formed by said cell, an electric oscillator exciting said cell, said oscillator including means for periodically sweeping the oscillating frequency thereof through a range corresponding to a spectrum to be scanned by said spectrometer, means disposed in the path of light passed by said optics and electrically responsive to light passing said optics, amplitude-display means connected to the output of said light-responsive means, marker means including a plurality of filters connected to and responsive to separate predetermined particular frequencies in the swept range of frequencies of said oscillator, said filters being connected to said display, means, whereby the detected light amplitude for each filter frequency may be unambiguously identified therewith in the display.

20. A spectrometer, comprising an ultrasonic light-modulating cell, means exposing said cell to light for spectral analysis, optics including said cell and including diaphragm means effective upon excitation of and in cooperation with said cell to pass a predetermined color component of the spectrum formed by said cell, a variable-frequency source exciting said cell, means disposed in the path of light passed by said diaphragm means and electrically responsive to light passed by said optics, marker means comprising an electric signal generator having an output characterized by discrete known frequencies in the range of frequency variation of said source, means connected to said source and to said marker means whereby varying frequency of said source necessarily causes the same concurrent frequency sweep of said cell and of said marker means, a cathode-ray display device including a sweep circuit synchronized with frequency variation of said source, and display-actuating control connections to said display device from the output of said light-responsive means and from the output of said last-defined means.

21. A spectrometer according to claim 20, in which the sweep on said display device extends along one deflection axis, and in which said control connections are applied to deflection means for another deflection axis.

References Cited in the file of this patent

UNITED STATES PATENTS

| | | |
|---|---|---|
| 2,084,201 | Karolus | June 15, 1937 |
| 2,158,990 | Okolicsanyi | May 16, 1939 |
| 2,240,722 | Snow | May 6, 1941 |
| 2,270,232 | Rosenthal | Jan. 20, 1942 |
| 2,287,587 | Willard | June 23, 1942 |
| 2,308,360 | Fair | Jan. 12, 1943 |
| 2,444,560 | Feldt et al. | July 6, 1948 |
| 2,513,520 | Rosenthal | July 4, 1950 |
| 2,602,368 | Barnes | July 8, 1952 |
| 2,623,942 | Schlesinger | Dec. 30, 1952 |
| 2,650,307 | Koppius | Aug. 25, 1953 |
| 2,723,589 | Bullock et al. | Nov. 15, 1955 |
| 2,807,799 | Rosenthal | Sept. 24, 1957 |

OTHER REFERENCES

Ultrasonics, Bergmann-Hatfield, John Wiley and Sons (1946), pages 63–65 relied on.

"Ultrasound Waves Made Visible," Willard, Bell Laboratories Record, vol. XXV, No. 5, May 1947, pages 194–200, pages 194–196 being relied on.

"Criteria for Normal and Abnormal Ultrasonic Light Diffraction Effects," The Journal of the Acoustical Society of America, vol. 21, No. 2, March 1949, pages 101–108.